Nov. 18, 1969   H. SEIP   3,478,848
DUAL CIRCUIT DISC BRAKE WITH HYDRAULIC ADJUSTING MEANS THEREFOR
Filed June 17, 1968   3 Sheets-Sheet 1

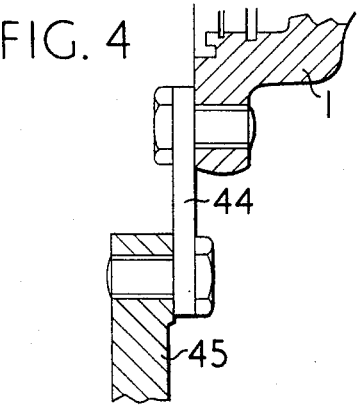
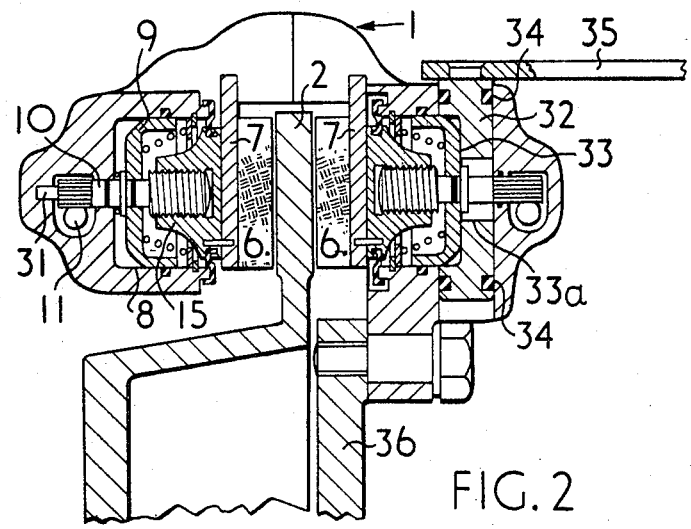

Nov. 18, 1969  H. SEIP  3,478,848
DUAL CIRCUIT DISC BRAKE WITH HYDRAULIC ADJUSTING MEANS THEREFOR
Filed June 17, 1968  3 Sheets-Sheet 3

United States Patent Office 3,478,848
Patented Nov. 18, 1969

3,478,848
DUAL CIRCUIT DISC BRAKE WITH HYDRAULIC ADJUSTING MEANS THEREFOR
Hermann Seip, Bad Vilbel, Germany, assignor to The Dunlop Company Limited, London, England, a corporation of Great Britain
Filed June 17, 1968, Ser. No. 737,583
Claims priority, application Germany, June 15, 1967, T 34,105
Int. Cl. B60t *11/24;* F16d *55/228*
U.S. Cl. 188—152                                    10 Claims

ABSTRACT OF THE DISCLOSURE

A disc brake for operation by two fluid pressure lines, comprising two brake operating mechanisms, each brake operating mechanism comprising a fluid pressure operated thrust mechanism associated with a friction element on one side of the brake disc and in fluid pressure communication therewith, a fluid pressure operated adjustment mechanism to provide adjustment for a friction element on the other side of disc.

---

This invention relates to disc brakes.

One object of the invention is to provide an improved disc brake for use in a braking system which incorporates two fluid pressure supply lines to actuate the brake.

According to one aspect of the invention a disc brake comprises a caliper arranged to straddle a portion of the periphery of a rotatable brake disc, a pair of independent fluid-pressure-actuated brake operating mechanisms associated with the caliper, and a pair of friction elements associated with the brake operating mechanisms and locatable one on each side of the brake disc for frictional engagement therewith, wherein each brake operating mechanism comprises a thrust mechanism associated with one friction element for urging the friction element into engagement with the brake disc, and in fluid pressure communication with the said thrust mechanism a fluid pressure actuated adjustment mechanism associated with the friction element on the other side of the disc to provide adjustment therefor.

According to another aspect of the invention there is provided a dual circuit opposed cylinder hydraulic disc brake with a hydraulic adjuster for each actuator piston, wherein the adjuster of one actuator piston is hydraulically connected to the oppositely situated cylinder of the other actuator piston in one brake circuit, and the adjuster device of the other actuator piston is hydraulically connected to the oppositely situated cylinder of the first actuator piston in the second brake circuit.

Three embodidents of the invention will now be described by way of example with reference to the accompanying drawings in which:

FIGURE 2 shows an axial cross-sectional view of a disc brake forming another embodiment of the invention, the view being in a circumferential direction with respect to the brake disc;

FIGURE 4 shows one method of mounting a disc brake accordance to the invention on a non-rotatable support.

Figure 1:
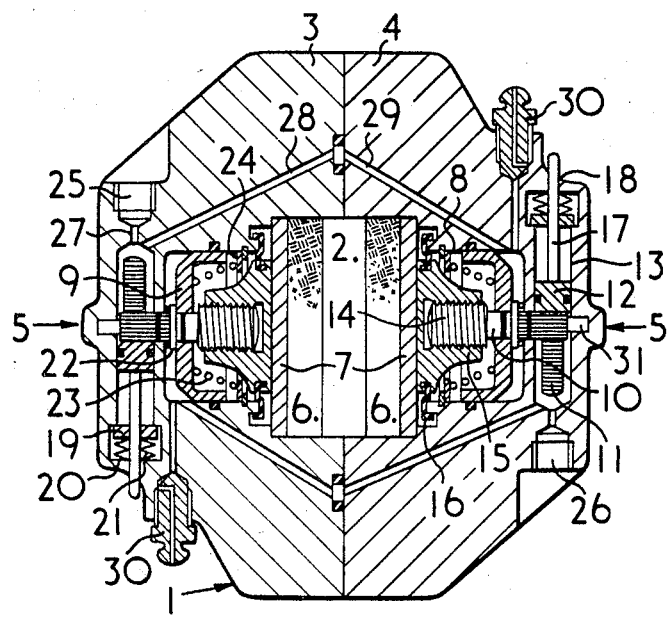
FIGURE 1 shows an axial cross-sectional view of a disc brake forming one embodiment of the invention, the view being in a radially inward direction with respect to the brake disc.

The disc brake shown in FIGURE 1 comprises a caliper 1 arranged to straddle a portion of the periphery of a rotatable brake disc 2. The caliper is formed in two parts 3, 4 secured together by means of set screws (not shown).

The brake is provided with a pair of independent fluid pressure-actuated brake operating mechanisms 5 associated with the caliper 1. A pair of friction elements each comprising a friction pad 6 and a backing plate 7 are associated with the brake operating mechanisms and located one on each side of the brake disc 2 for frictional engagement therewith.

Each brake operating mechanism comprises a thrust mechanism and a fluid pressure actuated adjustment mechanism in fluid pressure communication with the thrust mechanism.

The thrust mechanisms each comprise a cylinder 8 formed in the caliper 1 and a thrust piston 9 slidably located in the cylinder.

The adjustment mechanisms are each in the form of a rack-and-pinion mechanism whereof the pinion is in the form of a spindle 10 and the rack 11 is associated with an adjustment piston 12 slidably located in a bore 13 formed in the caliper 1.

Each spindle 10 extends in an axial direciton with respect to the brake disc 2 and at its axially innermost end is formed with an enlarged portion 14 in screw-threaded engagement with a thrust member in the form of a nut 15 which is engageable with and secured to its respective friction element backing plate 7 to transmit brake-applying thrust thereto. A rubber boot 16 is provided to prevent the ingress of dirt and the like between the nut 15 and the caliper 1. At its axially outermost end, each spindle is formed with a location spigot 31 extending into a corresponding blind bore formed in the caliper 1.

The adjustment pistons 12 each have secured thereto a piston rod 17 extending through an opening 18 formed in the caliper 1. A friction member in the form of a friction ring 19 is mounted in surrounding engagement with each piston rod in a chamber 20 formed in the caliper at one end of its respective bore 13.

Resilient return means for each friction ring 19 in the form of an assembly of Belleville washers 21 located on the respective piston rod 17 is provided in each chamber 20. The end of each chamber 20 remote from the respective adjustment piston 12 constitutes a stop to limit movement of the ring 19 with the piston rod 17 relative to the caliper 1, and the Belleville washers are arranged to bias the ring away from the stop.

An annular reaction shoulder 22 is formed on each spindle 10 and located between the piston 9 of the respective thrust mechanism and the axially outermost end, with respect to the brake disc, of its associated cylinder 8. The shoulder constitutes an abutment engageable with the caliper to limit movement of the spindle and piston in an axial direction with respect to the brake disc.

A coiled spring 23 is located within each cylinder 8 encircling the respective spindle 10 for retraction of the piston 9. Each spring 23 is mounted between an annular stop member 24 secured within the cylinder 8 near its axially innermost end and the piston 9, so that movement of the piston axially inwardly with respect to the brake disc towards the stop member causes compression of the spring.

The brake is arranged to be connectable to two fluid pressure supply lines (not shown) of a dual circuit braking system. Two fluid inlets 25, 26 are formed for this purpose one in each half 3, 4 respectively of the caliper, and communicate through drillings formed in the caliper with their respective brake-operating mechanisms 5. The inlet 25 communicates through a short drilling 27, with one end of the bore 13 of its respective adjustment mechanism. Another drilling 28 extending from the same end of the bore 13 communicates with a further drilling 29 to communicate fluid pressure from the inlet 25 to the cylinder 8 of the thrust mechanism on the other side of the disc 2. A system of pipes instead of the drillings would be equally suitable.

The inlet 26 communicates with its respective brake operating mechanism 5 through a system of drillings corresponding to those of the inlet 25 and each of the two fluid pressure circuits formed in the caliper has its own bleed valve 30.

The caliper 1 is mounted in an axially fixed position with respect to the brake disc 2 on a non-rotatable support (not shown) in the same manner as the caliper of the brake which is shown in FIGURE 2 and which will be described hereafter.

The operation of the brake is as follows.

Fuid is normally admitted to the brake simultaneously through both of the inlets 25, 26. The increase in fluid pressure arising from fluid entering through the inlet 25 is communicated to the bore 13 of the adjustment mechanism formed in the part 3 of the caliper. The fluid pressure acts upon the adjustment piston 12 causing it to move in the direction away from the inlet 25. The rack 11 moves with the adjustment piston and causes its associated pinion, the spindle 10, to rotate. The nut 15 however is non-rotatably mounted relative to the spindle and the abutment 22 formed on the spindle is in contact with the axially outer end surface of the cylinder 8. Thus rotation of the spindle causes the nut 15 and its associated friction element to move axially inwardly with respect to the brake disc until the associated friction pad is in contact with the disc.

The increase in pressure arising from fluid entering through the inlet 25 is also communicated to the cylinder 8 of the thrust mechanism in the part 4 of the caliper and causes the piston 9 to move in an axial direction towards the brake disc. After moving a short preliminary distance the piston exerts a brake-applying thrust on the nut 15 through the enlarged portion 14 of the spindle 10.

As the adjustment piston moves in the direction away from the inlet 25, the piston rod 17 and the friction ring 19 move with it, causing the assembly of Belleville washers 21 to be compressed at one end of the chamber 20. If, after compression of the washers 21, the clearance (arising for example from wear of the friction pads) between the friction pad 6 and the brake disc 2 has not been fully taken up, the further movement of the adjustment piston 12 to take up this clearance causes the piston rod 17 to be forced through the friction ring to a new position.

When the fluid pressure is reduced to release the brake, the spring 23 moves the piston 9 in a direction away from the disc 2 and into engagement with the shoulder 22. The Belleville washers 21 expand and urge the friction ring 19 to the other end of the chamber 20. The friction ring grips the piston rod and causes a similar movement of the adjustment piston 12 and the rack 11, causing the spindle to be screwed into the nut 15 and the associated friction pad 6 to be drawn away from the disc. Thus, on release of the brake, a predetermined amount of clearance is set up between the friction pad and the disc. The amount of clearance thus set up depends on the length of the chamber 20.

The operation of the thrust mechanism in the part 3 of the caliper and its associated adjustment mechanism in the part 4 of the caliper corresponds to that of the mechanisms described above.

If failure of one of the fluid supply lines to the brake occurs, the remaining intact line continues to operate the associated thrust mechanism on one side of the disc and the adjustment mechanism on the other side thereof. The adjustment mechanism then however not only operates to take up clearances as described above but functions also as an auxiliary thrust mechanism, thereby offsetting the otherwise unbalanced reaction force exerted on the caliper 1 by the main thrust mechanism on the other side of the disc. The rack and pinion mechanisms causes the spindle 10 to be rotated relative to the nut 15 so as to move the nut towards the disc 2 as already described, and after clearances have been taken up, between the friction pad 6 and the disc, further rotation of the spindle forces the friction pad against the respective side face of the disc.

It will be noted that the piston rods 17 provide, in addition to their fuction described above, means for readily resetting the adjustment mechanisms when new friction elements are fitted to the brake. Further, the amount by which each piston rod projects through its respective opening 18 in the caliper indicates the degree of wear of the friction element associated therewith.

A second embodiment of the invention is shown in FIGURE 2.

The brake shown in FIGURE 2 is similar to that of FIGURE 1 and parts of the brake have been given the same reference numerals as the corresponding parts of the brake of FIGURE 1.

The brake of FIGURE 2 is provided with a mechanical operating mechanism mounted on one side of the caliper 2. The mechanical brake operating mechanism comprises a cam member 32 in the form of a rod mounted at the axially outermost end with respect to the disc of the cylinder 8 formed in one side of the caliper, with the axis of the rod lying in a plane parallel to the plane of the disc. The rod is angularly movable about its axis and has a portion of reduced width intermediate its ends, the said portion providing a cam surface 33 for engagement with the respective piston 9. Seals 34 are provided at each end of the cam member to prevent leakage of fluid from the cylinder 8, and an aperture 33a is formed in the reduced width portion of the cam member to allow the spindle 10 to pass therethrough with clearance.

At the radially outer end of the cam member 32, with respect to the disc 2, an operating lever 35 is connected to the cam member to provide means for angularly moving the cam member about its axis.

The spindle 10 on the same side of the caliper as the mechanical brake operating mechanism is formed without a location spigot at its axially outermost end and the blind bore therefor formed in the caliper of the FIGURE 1 embodiment is also omitted.

The caliper 1 is bolted in an axially fixed position with respect to the brake disc 2, on a non-rotatable support 36.

The manner in which the brake operates when actuated by fluid pressure is similar to that described above in connection with the first embodiment. On actuation of the mechanical brake operating mechanism the cam member 32 is rotated, bringing the cam surface 33 into engagement with the axially outermost face of the respective piston 9 and moving the piston towards the disc 2. After clearances have been taken up, the associated friction pad 6 is brought into engagement with the respective side face of the disc 2. The friction pad 6 on the other side of the disc is simultaneously brought into engagement with the disc as a result not only of deflection of the caliper mounting and consequent axial movement of the caliper under the action of the reaction force generated by the mechanical brake operating mechanism, but also as a result of deflection of the disc in an axial direction under the action of the thrust applied thereto by the friction pad 6 directly actuated by the cam member 32.

Figure 3:
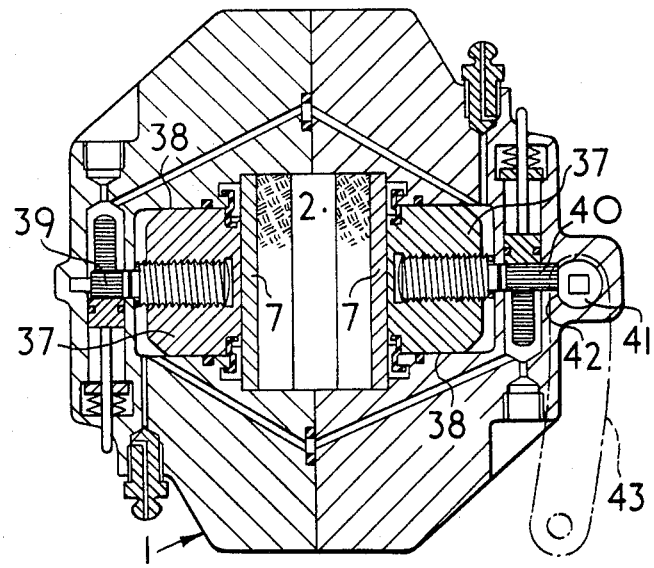
FIGURE 3 shows a view similar to that of FIGURE 1, of a disc brake forming a third embodiment of the invention.

A third embodiment of the invention is shown in FIGURE 3.

The brake shown in FIGURE 3 is constructed and arranged in the same manner as the brake shown in FIGURE 2 except insofar as will now be described, and parts of the brake have been given the same reference numerals as the corresponding parts of the brake of FIGURE 1.

The thrust mechanism of each fluid-pressure-actuated brake operating mechanism comprises a thrust member in the form of a thrust piston 37 slidably mounted in a thrust cylinder 38 formed in the caliper 1 and arranged to engage the backing plate 7 of its respective friction element.

Each thrust piston is arranged to be directly engageable with the backing plate 7 of its respective friction element and is associated with one of a pair of axially extending spindles 39, 40, each constructed and arranged in a similar manner to the spindles 10 of the brake shown in FIGURE 2.

A mechanical brake-operating mechanism is mounted on one side of the caliper and comprises a cam member 41 associated with the spindle 40 to cause its associated thrust piston to urge the respective friction element into engagement with the brake disc.

The cam member is rotatably mounted in the caliper and formed with a cam surface 42 engageable with the axially outermost end of the spindle 40. An operating lever 43 is coupled to the cam member to effect rotation thereof and application of the brake. When the friction element directly associated with the spindle 40 engages the disc 2, the friction element on the other side of the disc is also brought into engagement therewith in the same manner as is described above in connection with mechanical operation of the FIGURE 2 embodiment.

Operation of the brake by fluid pressure is as follows. The thrust piston of each brake operating mechanism is brought directly into engagement with its respective friction element backing plate by the fluid pressure, and each adjustment mechanism rotates its associated spindle 39 or 40 so as to cause the thrust pistons to move in a brake applying direction to take up clearance between the friction pad and the brake disc.

When the fluid pressure is reduced to release the brake each adjustment mechanism rotates its respective spindle in a similar manner to that described in connection with the first embodiment. No pad retraction mechanism is provided however, and after the above-mentioned clearance has been set up, the friction elements are moved axially away from the disc by "knock-back."

FIGURE 4 shows an alternative method of mounting the caliper of a brake according to the invention.

The caliper 1 is bolted to a resilient support means in the form of a torque-taking member 44 which itself is bolted to a non-rotatable support 45 for the caliper corresponding to the support 36 shown in FIGURE 2. This arrangement provides a more resilient mounting for the caliper, giving improved brake operation by the mechanical actuating devices and improved operation in the event of failure of one of the fluid pressure supply lines to the brake.

The advantages provided by the invention are as follows.

In the past it has been proposed to provide a disc brake for operation by two independent fluid supply lines and having two pairs of friction elements actuated by two pairs of opposed piston and cylinder assemblies arranged for connection to one each of the supply lines, each piston having its own adjustment mechanism operated by the same fluid pressure supply line as the piston itself.

Upon failure of one of the fluid supply lines to such a brake, one pair of piston and cylinder assemblies and their associated friction elements is put out of action completely and the effective area of friction material engaging the disc is therefore halved.

In the embodiments of the present invention described above, when one of the fluid supply lines fails, both friction elements remain fully operable and the brake remains fully effective. Further, these brakes are considerably less expensive to manufacture since only one pair of opposed piston and cylinder assemblies is required, compared with the two pairs required for the brakes referred to in the last preceding paragraph.

In another known fixed caliper disc brake, with hand brake operation, the hydraulic connection is so arranged so that each half of the caliper can be operated by an independent brake circuit. Each brake circuit is also associated with a rear wheel. With this arrangement, in the event of failure of one circuit, the pedal travel doubles but the brake force proportioning and the deceleration as a function of pedal effort, remain approximately the same. The disadvantage of this arrangement is that after a number of hydraulic brake applications the appropriate adjusting movement takes place, so that ultimately seizure of the brake takes place. Such seizure is avoided in the brakes of the present invention described above. With failure of a circuit, each piston is adjusted so that seizure of the brake as a consequence of disc distortion, is excluded.

Having now described our invention what we claim is:

1. A dual circuit opposed piston-cylinder hydraulic disc brake with a hydraulic adjuster for each actuator piston, wherein the adjuster of one actuator piston is hydraulically connected to the oppositely-situated cylinder of the other actuator piston in one brake circuit, and the adjuster device of the other actuator piston is hydraulically connected to the oppositely-situated cylinder of the first actuator piston in the second brake circuit.

2. A disc brake comprising a caliper arranged to straddle a portion of the periphery of a rotatable brake disc, a pair of independent fluid-pressure-actuated brake operating mechanisms associated with the caliper, and a pair of friction elements associated with the brake operating mechanisms and locatable one on each side of the brake disc for frictional engagement therewith, wherein each brake operating mechanism comprises a thrust mechanism associated with one friction element for urging the friction element into engagement with the brake dis, and in fluid pressure communication with the said thrust mechanism a fluid-pressure-actuated adjustment mechanism associated with the friction element on the other side of the disc to provide adjustment therefor.

3. A disc brake according to claim 2 comprising resilient support means arranged to carry the caliper on a non-rotatable support.

4. A braking system comprising a disc brake according to claim 2 and two source of fluid pressure, one for connection to each brake operating mechanism.

5. A disc brake according to claim 2 wherein the adjustment mechanisms each comprise a rack-and-pinion mechanism.

6. A disc brake according to claim 5 wherein each thrust mechanism comprises a thrust member to transmit thrust to its associated friction element, and the pinion of each rack-and-pinion mechanism is in the form of a spindle having an abutment engageable with the caliper to limit movement of the spindle in an axial direction with respect to the brake disc, the spindle being in screw-threaded engagement with the thrust member.

7. A disc brake according to claim 6 comprising a mechanical brake operating mechanism mounted on one side of the caliper, the mechanical brake operating mechanism having a cam member associated with one of the spindles to urge the respective friction element into engagement with the brake disc.

8. A disc brake according to claim 5 wherein the rack of each rack-and-pinion mechanism is associated with an adjustment piston slidably located in a bore formed in the caliper.

9. A disc brake according to claim 8 wherein each piston is provided with a piston rod extending through an opening formed in the caliper and indicating the degree of wear of the friction element associated therewith.

10. A disc brake according to claim 9 comprising a friction member mounted in engagement with each piston rod and arranged to resist movement of the rod relative thereto, a stop to limit movement of the friction member with the piston rod relative to the caliper, and resilient return means associated with the friction member and arranged to bias the friction member away from the stop.

References Cited
UNITED STATES PATENTS

| | | | |
|---|---|---|---|
| 2,554,065 | 5/1951 | Shields | 188—196 X |
| 2,614,662 | 10/1952 | Hawley | 188—72 |
| 2,888,102 | 5/1959 | Eksergian et al. | 188—72 |

GEORGE E. A. HALVOSA, Primary Examiner

U.S. Cl. X.R.

188—73, 106, 196